EGGLESTON & SWAIN.
Grain Drill.

No. 62,259.  Patented Feb. 19, 1867.

Witnesses:
J. J. Peyton
Theodore Laug

Inventors:
A. R. Eggleston
C. J. Swain
by their Attys.
Baldwin & Son.

United States Patent Office.

ANDREW R. EGGLESTON AND CHARLES F. SWAIN, OF RIPON, WISCONSIN.

Letters Patent No. 62,259, dated February 19, 1867.

---

IMPROVED SEEDING MACHINE.

---

*The Schedule referred to in these Letters Patent and making part of the same.*

---

TO ALL WHOM IT MAY CONCERN:

Be it known that we, ANDREW R. EGGLESTON and CHARLES F. SWAIN, both of Ripon, in the county of Fond du Lac, and State of Wisconsin, have invented a new and useful Improvement in Seeding Machines, of which the following is a full, clear, and exact description, reference being had to the accompanying drawings, which make part of this specification, and in which—

Figure 1:
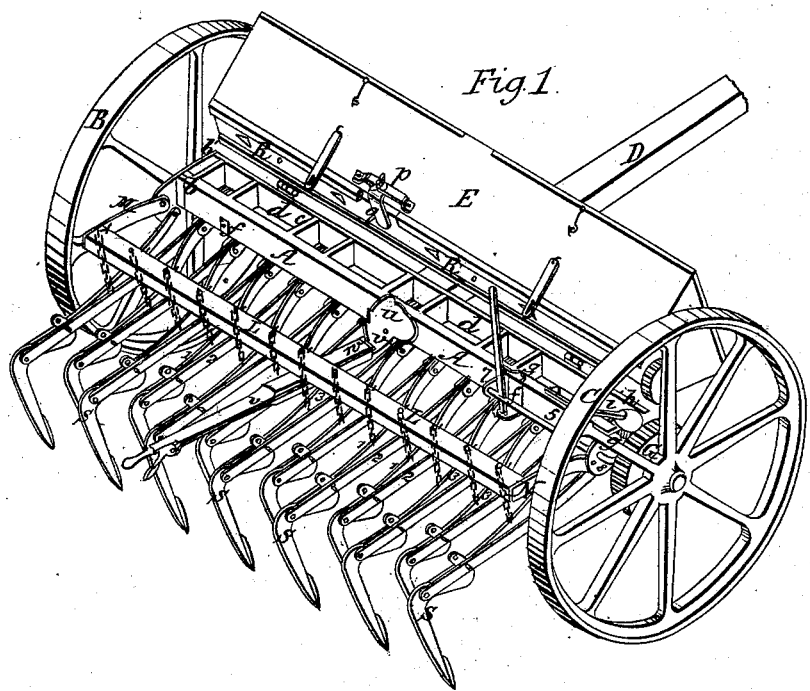
Figure 1 is a view in perspective of a seeding machine having our improvement attached.
Figure 5:
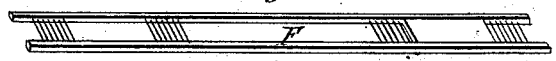
Figure 5 is a plan view of the scatterer.

Our improvements have relation to a class of machines for sowing small grain broadcast; and it is the object of our invention to scatter the grain uniformly over the surface to be planted, and to cover it evenly; to which end our invention consists, first, in arranging a rapidly vibrating scatterer below the grain-box, so as to distribute the seeds uniformly upon the ground, however irregular its surface; second, in arranging a series of boxes, open at the top and bottom, between the seed-gauge and the scatterer, so that the grain may not rest in a mass upon the scatterers, but be agitated before passing through them; third, in making the axle of the machine a box, to constitute the whole frame that supports the seed-box, the tongue, and the coverers, and to form two of the sides of the series of boxes between the seed-trough and the scatterer; fourth, in arranging triangular-shaped openings, and combining therewith an adjustable gauge-slide, beneath the feed-rollers, to adapt the gauge with facility to sowing either the finest grass-seed or larger grain with precision; fifth, in forming the drag-bars of the coverers of sheet-metal strips, and uniting these strips nearly centrally in pairs, so that the right plate, side, or strip of one bar, and the left plate of the next, shall be united with a single bolt to the axle, while the coverers are secured between their outer ends.

The axle A is supported on two wheels, B, and C has a tongue, D, attached to its centre in front, and a series of cultivator or covering teeth, $a\ a\ a$, attached behind, and it supports a seed-hopper or reservoir, E, on its top. Thus arranged, the axle alone constitutes the frame of our seeding machine. Our axle is composed of two plates, $b$ and $b'$, of suitable strength, placed some distance apart and parallel with each other. Partition blocks, $c\ c$, are placed between them, and all are secured together by screw-bolts, which may pass through the blocks $c$ in numbers sufficient to render the axle strong and rigid; and thus the spaces $d$ between the partitions serve to permit the seed to be agitated and separated before passing through the scatterer, and dispense with any necessity for guide-tubes. The journals for the wheels B and C may be attached beneath each end of the axle; the tongue D may be fastened securely to the centre of the piece $b'$, and the cultivators or coverers may be secured to the lower edge of the plate $b$, while the seed-box or hopper may be hinged to the top of either plate $b$ or $b'$, though in this example we have hinged it to the front plate or $b'$ for convenience. Beneath the axle, and in immediate contact with it, we arrange a scatterer, F, made of two side-pieces, united by any number of wires placed in groups throughout its length, the wires in each group being wide enough apart to permit the passage of the seed between them, and the groups being so placed as that one shall be directly beneath each one of the openings in the hopper; or the scatterer may be stamped out of a strip of sheet metal instead of using the frame and wires. This scatterer may reciprocate in grooves cut in the under inner edges of the plates $b$ and $b'$, being held up by straps, $f\ f'$, placed and fastened to the bottom of the axle. A wheel, G, having teeth on its face and inner edge, is secured to the inside of the wheel C, and rotates with it. A pinion, $g$, gearing with the teeth on the edge of the wheel G, rotates on a stud in the axle, and carries a disk on its top, to which a crank-pin, $h$, is secured. A pitman or bent strap, $i$, is secured at one end to the scatterer, and the other rests on the crank-pin $h$, and as the machine advances the rotation of the crank-pin vibrates the scatterer rapidly; or the scatterer may be vibrated by an eccentric instead of a crank-pin. It is obvious that when desired the scatterers may be made in separate pieces, and connected to a vibrating rod to give them motion. To suspend the operation of sowing while the machine is going to the field, or turning or moving on the road, we have the toothed wheel G united to the wheel C by a sliding connection under the control of a slide-bar, 5, and hand-lever, 6, the bar being properly secured in guides 7 and 8, with a stop-catch, 9, to hold the lever in position.

Figure 2:
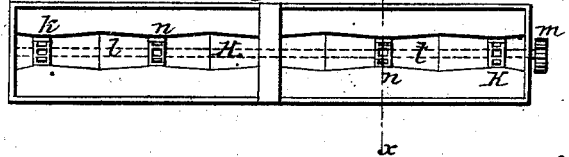
Figure 2 is a plan view of the inside of the hopper or grain-box.
Figure 3:
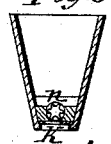
Figure 3 is a section through the same on the line $x\ x$ of fig. 2.
Figure 4:
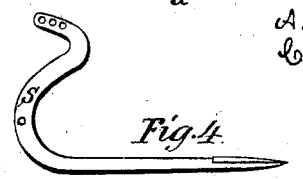
Figure 4 is a side view of one of the covering teeth.

Thus moving the lever to the right will throw the sowing mechanism out of gear, while moving it to the left will put it in operation. The seed-trough is provided with suitable openings, k, in its bottom, with inclined strips, l, between the openings. A rod, H, shown in dotted lines in fig. 2, passes through the bottom of the trough, and carries a toothed pinion, m, on the end next the wheel C, and small pinions, n, that rotate in the openings k of the seed-trough. The pinion m gears with the teeth on the face of the gear-wheel G when the trough is in position; and thus, when the machine is in motion, the rod H is rotated beneath the trough, and the pinions n deliver the grain in regulated quantities. A plate, o, covers the bottom of the grain-trough, and has, beneath the pinions n on the rod H, triangular openings, R. On the plate o a gauge-plate is made to slide so as to open or close the triangular-shaped openings R, the gauge-plate being attached to a bolt, p, that carries a tightening-screw nut by the strap q; and when the tightening nut is released the gauge-plate can be moved to the right and left to cover more or less of the triangular openings, which, from their shape, require the gauge to be moved but a short distance to adapt the feed to seed of any size, or to deliver it in any quantity desired. The seed, in falling through the boxes d, reaches the scatterer in an open state, instead of falling in a mass, and is loosened in the boxes, even when in a damp condition, by the motion of the scatterers, in passing through which the seed is knocked with force sufficient to scatter it evenly over the ground. To the rear plate b of the axle, and at its lower rear edge, we attach staples or collars, r, as many as we propose to use coverers or cultivators with each machine. The shanks which support the coverers are made from straight strips of sheet metal, each shank being composed of two plates, 1 and 2, that are united near their centre upon a brace or stay-block, 3, by a rivet which passes through the plates and block to hold them together. These stay-rods are coupled, at the point where they are attached to the axle, by having the leaves or strips of two shanks brought together in one of the staples, where they are secured by a bolt; and thus the shanks are securely braced against lateral vibration, which would not be the case were both plates of the same shank pivoted to one staple. Between the opposite or rear ends of the plates of the shanks we pivot the coverers or cultivators s, which are bent at their upper ends in the form of an S, and have holes punched through at several places, while the cultivator teeth or coverers, of any of the most approved forms, are attached to their lower ends. Holes are punched in the ends of the shanks opposite the holes in the ends of the cultivators, and the shanks and cultivators are held together by wooden pins passed through these holes in both; and when the tooth of the cultivator encounters a rigid obstacle the breaking of the wooden pin releases this connection with the shank, and the cultivator swings back uninjured. At the same time, the change of the wooden pin from one hole to the other, in the upper end of the cultivators s, will give the tooth a new adjustment, and enable it to work deeper or shallower, as may be desired. The whole of the shanks are attached by chains, t, to a bar, L, that is pivoted by straps, M and M, to the axle A; and of course the bar is free to rise and fall; but to regulate its position and fix it when at the elevation desired, we fix a rack-segment, u, securely to the centre of the rear plate of the axle. To this plate we pivot a lever, w, that has a spring-catch, v, attached to it by a rod that terminates at one end in a latch, x, near the handle of the lever w, and at the other end in the catch which works in the segment-rack. Now, when it is desired to raise the cultivators out of the ground it is only necessary to lift the lever w, and the spring-catch will hold the beam L in an elevated position, because the catch will rest on a higher tooth in the segment-ratchet u. When it is desired to depress the cultivators so that they can work in the ground, it is only necessary to press the latch, when the spring-catch will be withdrawn from the ratchet and the cultivators will fall into a working position.

What we claim as our invention, and desire to secure by Letters Patent, is—

1. A scatterer placed below the axle, and arranged and operated substantially in the manner and for the purpose set forth.

2. The arrangement of a series of seed-boxes between the grain-box and scatterer, substantially as and for the purpose set forth.

3. The axle so constructed as to form the frame supporting the seed-box and cultivators, and the boxes between the seed-box and scatterer.

4. The combination of a gauge-plate, triangular openings in the bottom of the seed-box, and feeding pinions, with the seed-trough, substantially as and for the purpose set forth.

5. The drag-bars, when formed substantially as described, and combined with the axle and cultivators, substantially as and for the purpose set forth.

In testimony whereof we have hereunto subscribed our names.

A. R. EGGLESTON,
CHARLES F. SWAIN.

Witnesses:
   GEO. PERKINS,
   THOS. BRYANT.